Nov. 17, 1931.                H. T. HALLOWELL                1,832,770
                          TRUCK AND CASTER THEREFOR
                   Filed Feb. 8, 1928          2 Sheets-Sheet 1
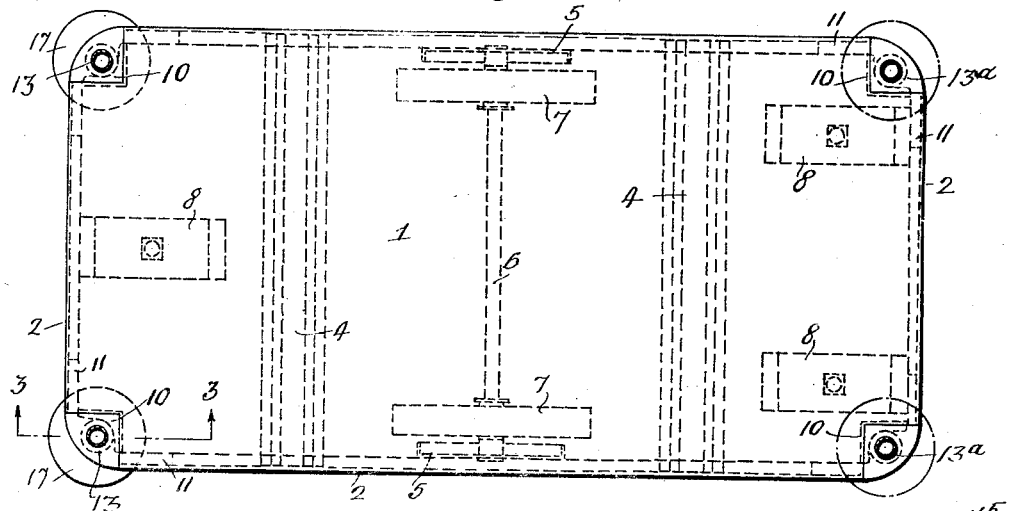
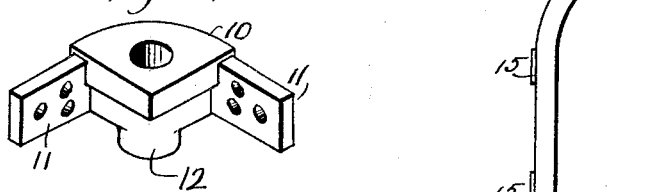
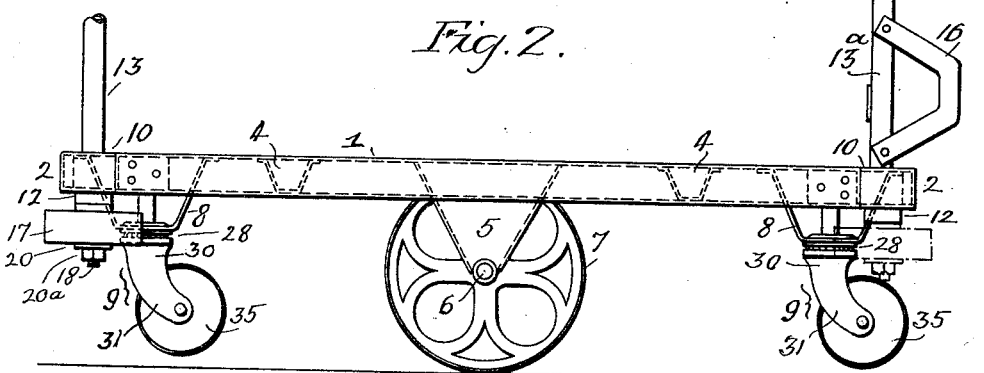
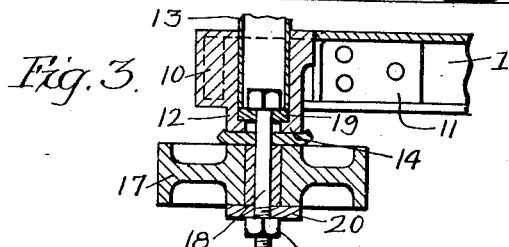
Inventor
Howard T. Hallowell
by his Attorneys

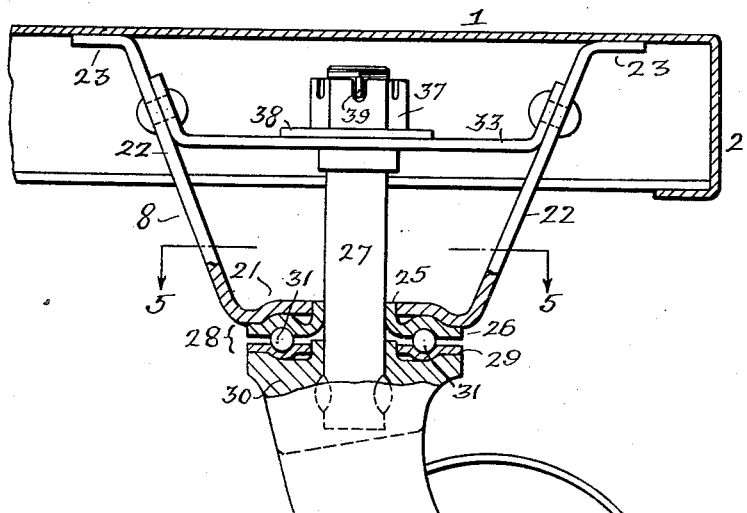
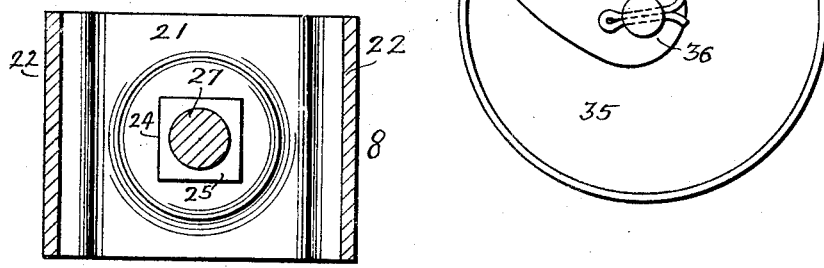
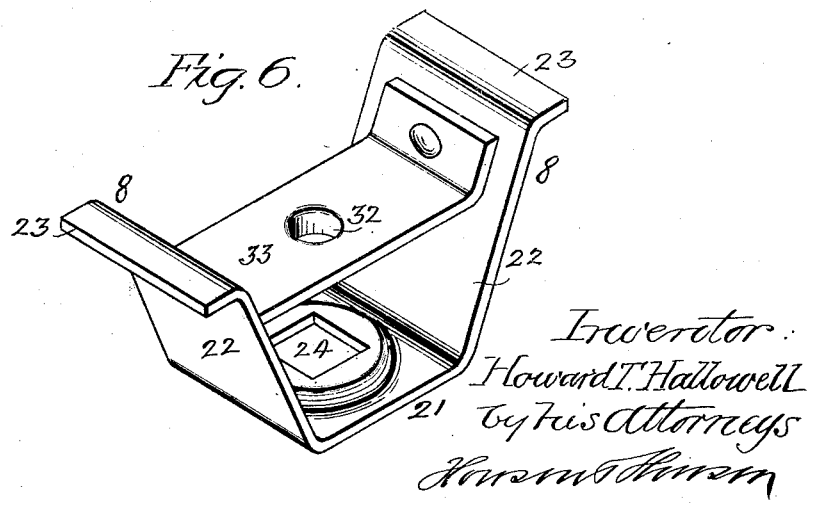

Patented Nov. 17, 1931

1,832,770

UNITED STATES PATENT OFFICE

HOWARD T. HALLOWELL, OF JENKINTOWN, PENNSYLVANIA, ASSIGNOR TO STANDARD PRESSED STEEL CO., OF JENKINTOWN, PENNSYLVANIA, A CORPORATION OF PENNSYLVANIA

TRUCK AND CASTER THEREFOR

Application filed February 8, 1928. Serial No. 252,845.

My invention relates to certain improvements in trucks used in factories and warehouses for transporting goods, but it will be understood that the invention can be applied to other forms of rolling stock without departing from the essential features of my invention.

The object of my invention is to improve the construction of the casters of a truck and their supports, so as to make them very substantial and yet comparatively cheap to manufacture.

The invention also relates to certain details of construction described hereinafter.

In the accompanying drawings:

Fig. 1 is a plan view of my improved truck embodying my invention;

Fig. 2 is a side view;

Fig. 3 is a sectional view on the line 3—3, Fig. 1;

Fig. 4 is an enlarged view of one of the casters and the supports which are located at the ends of the truck;

Fig. 5 is a sectional view on the line 5—5, Fig. 4;

Fig. 6 is a detached perspective view of one of the caster supports; and

Fig. 7 is a detached perspective view of one of the stake pockets.

Referring to the drawings, 1 is the platform of the truck, which in the present instance is made of sheet metal and which has a downwardly extending flange 2. The end of this flange is turned in as shown in Fig. 4, so as to materially stiffen the edge of the platform. It will be understood, however, that the platform may be made in other ways without departing from the scope of my invention.

Extending across the platform under the body thereof are U-shaped braces 4. These braces are particularly desirable in trucks of large sizes, where the weights are excessive. However, in small trucks, these braces may be dispensed with.

At the center of the truck are bearings 5 for the shaft 6, on which are large wheels 7 spaced apart as shown in Fig. 1.

At each end of the truck are supports 8 for casters 9. In the present instance the truck has a single caster at one end and two casters at the opposite end. At each corner of the platform are stake-pockets 10, which are made of cast metal and provided with extensions 11, to which the flanges 2 are secured by rivets or other fastening means. The socket portions 12 of the stake pockets extend below the platform so as to provide an extended bearing for the stakes 13—13a. Each socket has an inturned flange 14 at its lower end to form a seat for the lower end of the stake.

The stakes are round and hollow in the present instance and may be of any length desired. The stakes 13 at the forward end of the truck shown in Fig. 1 are plain tubes, while the stakes 13a at the rear of the truck are connected by cross-bars 15, the upper bar forming a handle. Secured to each stake 13a is a U-shaped bumper 16 which extends beyond the body of the truck as shown in Fig. 2.

In the present instance at the forward end of the truck are buffer wheels 17 mounted on spindles 18 depending from the lower ends of the forward stake pockets 10. In each stake pocket is a washer 19. This washer rests on the inturned flange 14 as shown in Fig. 3, and the head of the spindle 18 rests on the washer. Below the bumper wheel is another washer 20 and a nut 20a which retains the wheel on the spindle. All four stake pockets may be provided with buffer wheels as shown by dotted and full lines in Figs. 1 and 2, and particularly when plain stakes are used at the rear end of the truck.

Each support 8 for a caster consists of a shaped strip of metal 21 having diagonal arms 22 with lateral extensions 23 at their upper ends. These extensions are welded or otherwise secured to the underside of the platform 1. The strip of metal 21 has a rectangular opening 24 at the center for the projecting portion 25 of the upper race plate 26 of a ball-bearing 28, the strip 21 being shaped to fit the race plate 26 as shown in Fig. 4.

This upper race plate 26 is formed by pressing the metal into shape, and the central projecting portion 25 is of such size as to allow the pintle 27 of the caster to pass freely through it. The ball-bearing 28 carries the load and centers the pintle of the caster.

A lower race plate 29 rests on the shaped upper end of the body 30 of the caster 9, and between the two plates are a series of balls 31, forming a complete ball-bearing 28.

The upper bearing 32 for the spindle 27 is formed in a cross-bar 33 having upturned ends which are riveted or otherwise secured to the inclined portions 22 of the support 8. The bearing 32 for the upper end of the spindle is extended by forcing the metal from the bar when making an opening for the spindle, as shown in Fig. 6.

In order to hold the balls in place and the spindle in position in the bearings, the upper end of the spindle is threaded, and mounted on the threaded portion of the spindle is a Cassel nut 37, and between this nut and the upper bearing 32 is a washer 38. The Cassel nut is locked in position by a cotter or other pin 39. By withdrawing the cotter-pin and turning the spindle in the nut, the caster can be readily removed from its support when necessary. By this construction the spindle is held rigidly at both its upper and lower ends, as the support 8 is of a very rigid construction and will resist blows which are due to careless handling of the truck.

The body of the caster is forked as at 34. Mounted between the forks is the caster-wheel 35 which is mounted on a shaft 36. The spindle 27 is cast in the head of the caster in the present instance.

I claim:—

1. The combination in a sheet metal caster carrier having lateral extensions at its upper end by which it is secured to the body of a truck and having a cross-bar, said cross-bar forming the bearing for a spindle, the lower end of the carrier being shaped to receive a ball-bearing; a caster having a pintle fixed thereto; and a ball-bearing mounted between the caster and the carrier, the upper raceway of the ball-bearing extending through an opening in the carrier.

2. The combination of a caster carrier having upper and lower bearings; a caster having a pintle fixed thereto; and a ball-bearing located between the body of the caster and the carrier, said ball-bearing having upper and lower raceways, the lower member of the carrier having a rectangular opening, and the upper raceway having a central projecting portion extending into the rectangular opening.

3. The combination of a carrier made in two parts, one part being U-shape in form and having lateral extensions arranged to be secured to the underside of a truck, the other part extending across the U-shape frame and secured thereto; a caster having a fixed pintle extending through the lower portion of the carrier and through the cross-bar, said cross-bar having an integral extended bearing; and a ball-bearing located between the body of the caster and the lower bearing, the upper raceway of the ball-bearing having an extended portion projecting into an opening in the main portion of the carrier.

4. The combination in a truck, of a caster carrier secured to the body of the truck and having a cross-bar, said cross-bar forming the bearing for a pintle, the lower end of the carrier being shaped to receive a ball-bearing, the upper raceway of the ball-bearing having a central extension extending through an opening in the carrier and locked thereto; and a caster having a pintle fixed thereto, the lower raceway of the ballbearing being mounted on the caster.

HOWARD T. HALLOWELL.